(12) United States Patent
Schlosser et al.

(10) Patent No.: US 7,810,484 B2
(45) Date of Patent: *Oct. 12, 2010

(54) HEAT DISTRIBUTING COOKING GRATE WITH GREASE CONTROL STRUCTURE FOR A BARBECUE GRILL

(75) Inventors: Erich J. Schlosser, Barrington, IL (US); Adrian A. Bruno, Rolling Meadows, IL (US); Mark Johnson, Cary, IL (US)

(73) Assignee: Weber-Stephen Products Co., Palatine, IL (US)

( * ) Notice: Subject to any disclaimer, the term of this patent is extended or adjusted under 35 U.S.C. 154(b) by 807 days.

This patent is subject to a terminal disclaimer.

(21) Appl. No.: 10/735,584

(22) Filed: Dec. 12, 2003

(65) Prior Publication Data

US 2004/0216621 A1 Nov. 4, 2004

Related U.S. Application Data

(60) Provisional application No. 60/433,485, filed on Dec. 13, 2002.

(51) Int. Cl.
*A47J 37/00* (2006.01)
(52) U.S. Cl. ................... 126/25 R; 99/445; 99/446
(58) Field of Classification Search ............... 126/41 R, 126/25 R, 39 B; 99/444, 445, 446, 447, 450
See application file for complete search history.

(56) References Cited

U.S. PATENT DOCUMENTS

| 1,133,850 | A | | 3/1915 | Garraux |
| 1,483,159 | A | | 2/1924 | Coleman |
| 2,154,305 | A | | 4/1939 | Goerl |
| 2,253,834 | A | * | 8/1941 | Volks ................... 99/446 |
| 2,787,995 | A | | 4/1957 | Alter |
| 3,033,191 | A | | 5/1962 | Bonadiman |
| 3,418,921 | A | * | 12/1968 | Fautz ................... 99/445 |
| 3,452,736 | A | | 7/1969 | Harff et al. |
| 3,586,518 | A | | 6/1971 | Folmar |
| 3,611,911 | A | | 10/1971 | Martin |
| 3,611,915 | A | | 10/1971 | Glaser et al. |
| 3,688,758 | A | | 9/1972 | Stephen |
| 3,791,370 | A | | 2/1974 | Fauser |
| 3,859,978 | A | | 1/1975 | Smith |
| 3,959,620 | A | | 5/1976 | Stephen |

(Continued)

FOREIGN PATENT DOCUMENTS

CA 2280312 A1 * 2/2001

(Continued)

*Primary Examiner*—Steven B. McAllister
*Assistant Examiner*—Sarah Suereth
(74) *Attorney, Agent, or Firm*—Baker & McKenzie LLP; David I. Roche; Daniel A. Tallitsch

(57) ABSTRACT

The present invention provides a cooking grate for use within a barbecue grill assembly. The cooking grate is located within a cooking chamber of the barbecue grill and adjacent the heat source. The cooking grate has an energy receptor portion and cooking members depending therefrom. The energy reception portion of the cooking grate receives energy from the heat source. The energy received by the energy reception portion of the cooking grate is then conducted through the cooking grate to cooking members to cook food thereon. The present invention also provides a grease control structure for the grate to assist in directing the flow of grease away from the burners.

24 Claims, 11 Drawing Sheets

U.S. PATENT DOCUMENTS

| | | | |
|---|---|---|---|
| 3,967,613 A | 7/1976 | Rybak et al. | |
| 4,020,322 A | 4/1977 | Muse | |
| 4,089,258 A | 5/1978 | Berger | |
| 4,108,142 A | 8/1978 | Barson et al. | |
| 4,140,049 A | 2/1979 | Stewart | |
| 4,321,857 A | 3/1982 | Best | |
| 4,403,541 A | 9/1983 | Berger | |
| 4,453,530 A | 6/1984 | Schlosser | |
| 4,463,746 A | 8/1984 | Knuth et al. | |
| 4,495,860 A | 1/1985 | Hitch et al. | |
| 4,512,249 A | 4/1985 | Mentzel | |
| 4,574,770 A | 3/1986 | Wells | |
| 4,593,676 A | 6/1986 | Wackerman | |
| 4,606,261 A | 8/1986 | Bernardi | |
| 4,677,964 A | 7/1987 | Lohmeyer et al. | |
| 4,703,746 A | 11/1987 | Hitch | |
| RE32,754 E | 9/1988 | Hahn | |
| 4,917,006 A | 4/1990 | Bowen et al. | |
| 4,930,491 A * | 6/1990 | Purello | 126/41 R |
| 4,976,252 A | 12/1990 | Cianciola | |
| 4,979,440 A | 12/1990 | Latour et al. | |
| 5,009,151 A | 4/1991 | Hungerford | |
| 5,065,734 A | 11/1991 | Elliott | |
| 5,076,155 A | 12/1991 | Golob | |
| 5,086,752 A | 2/1992 | Hait | |
| 5,105,725 A * | 4/1992 | Haglund | 126/25 R |
| 5,167,183 A | 12/1992 | Schlosser | |
| 5,218,950 A | 6/1993 | Hait | |
| 5,259,299 A * | 11/1993 | Ferraro | 99/445 |
| 5,277,106 A | 1/1994 | Raymer et al. | |
| 5,279,277 A | 1/1994 | Barker | |
| 5,331,942 A | 7/1994 | McDonald et al. | |
| 5,359,988 A | 11/1994 | Hait | |
| D364,777 S | 12/1995 | Schlosser et al. | |
| 5,490,452 A | 2/1996 | Schlosser et al. | |
| 5,603,256 A | 2/1997 | Charlson et al. | |
| 5,755,154 A * | 5/1998 | Schroeter et al. | 126/25 R |
| 5,765,469 A | 6/1998 | Schlosser et al. | |
| 5,839,361 A | 11/1998 | Richter | |
| 5,911,812 A * | 6/1999 | Stanek et al. | 126/25 R |
| 5,934,183 A | 8/1999 | Schlosser et al. | |
| 5,934,184 A | 8/1999 | Schlosser et al. | |
| 6,158,330 A * | 12/2000 | Andress | 99/445 |
| 6,260,478 B1 * | 7/2001 | Harneit | 99/446 |
| 6,267,047 B1 | 7/2001 | Mosher, II et al. | |
| 6,283,114 B1 | 9/2001 | Giebel et al. | |
| 6,481,343 B1 | 11/2002 | Rigney et al. | |
| 7,073,429 B2 | 7/2006 | Bruno et al. | |
| 2006/0048765 A1 | 3/2006 | Bruno et al. | |

FOREIGN PATENT DOCUMENTS

| | | | |
|---|---|---|---|
| DE | 100 33 294 A1 * | 1/2002 | |
| GB | 492713 A | 9/1938 | |

* cited by examiner

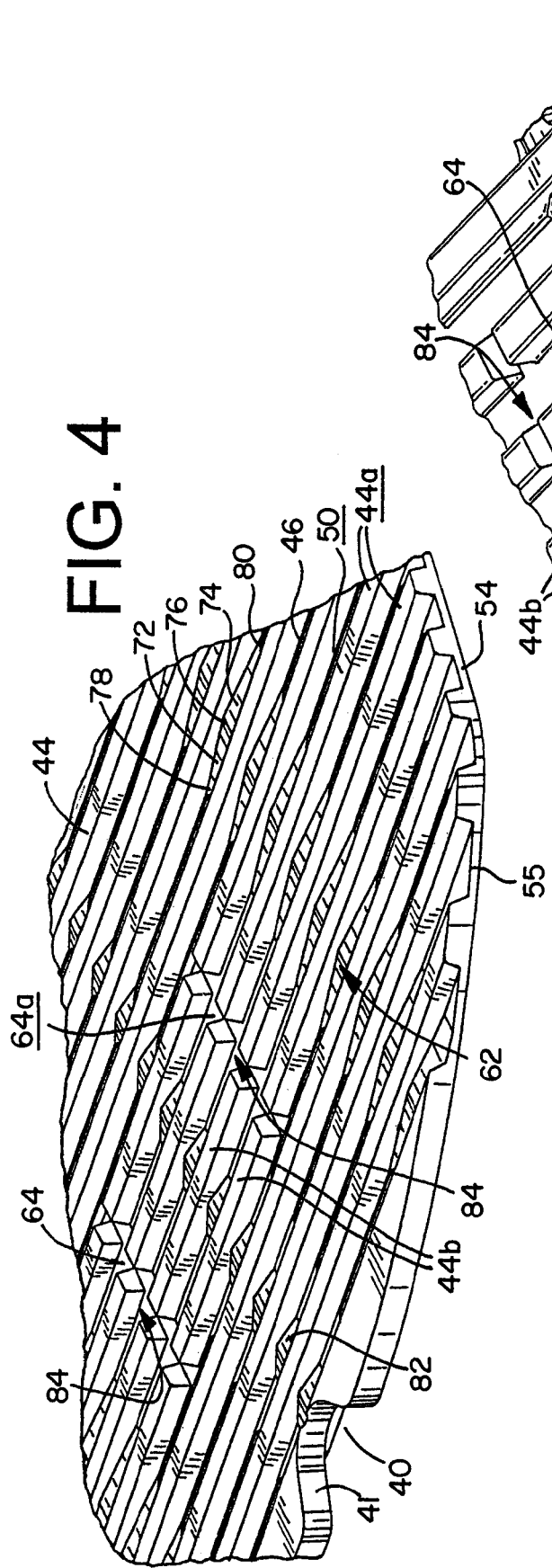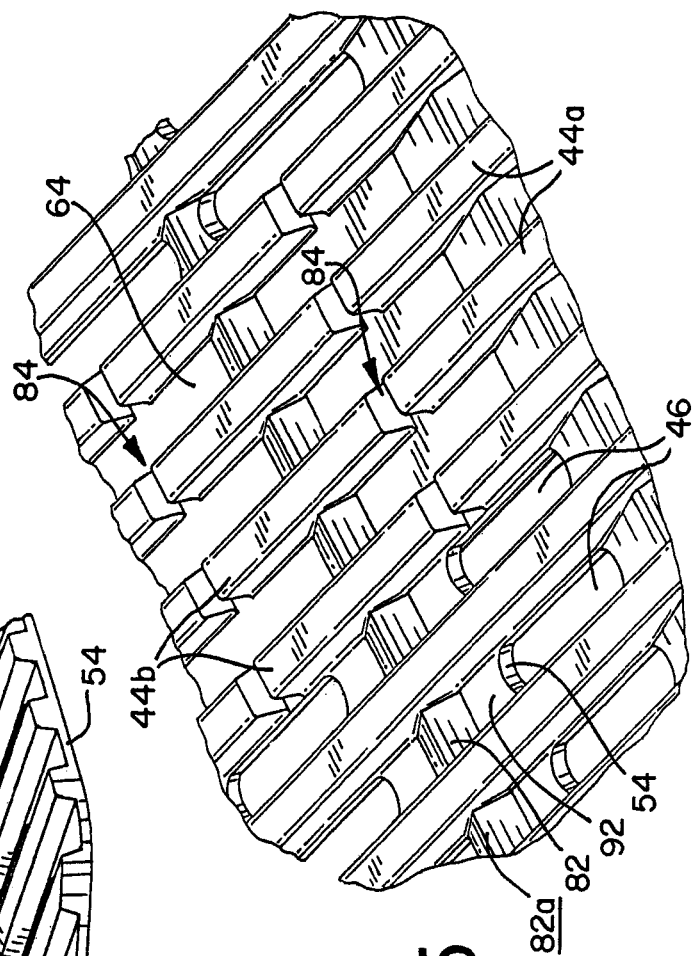

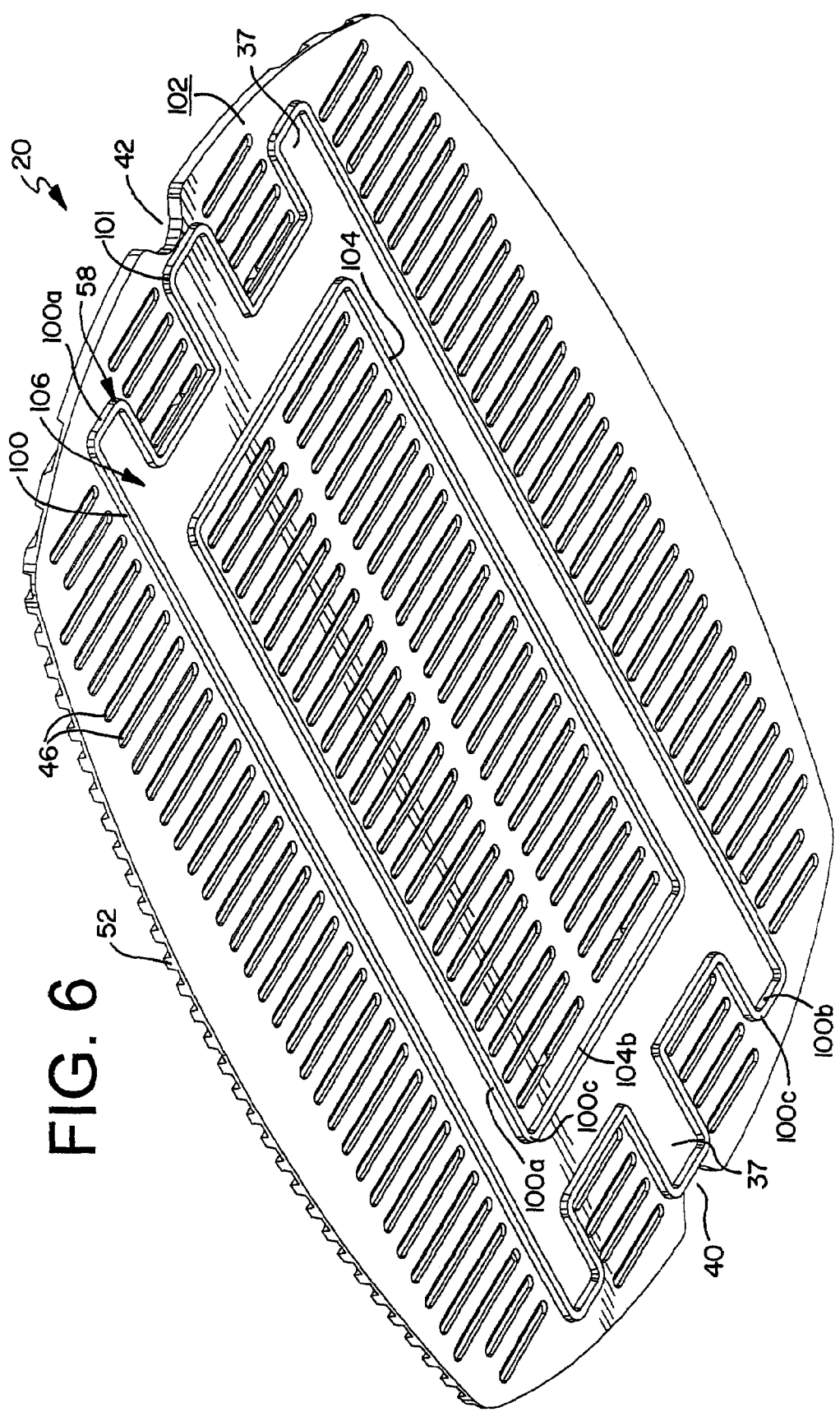

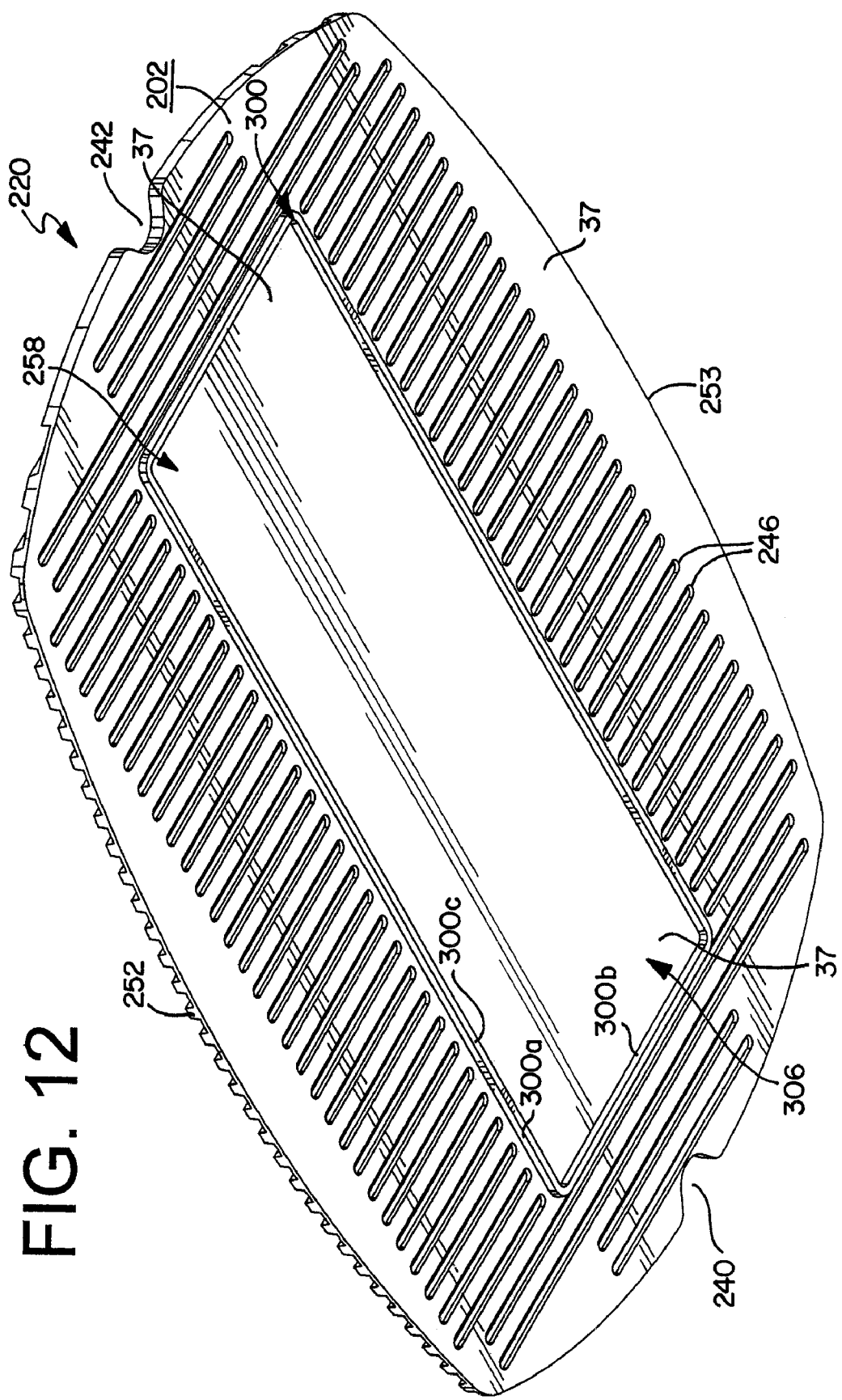

HEAT DISTRIBUTING COOKING GRATE WITH GREASE CONTROL STRUCTURE FOR A BARBECUE GRILL

CROSS-REFERENCE TO RELATED APPLICATIONS

This application claims priority from and expressly incorporates by reference and makes a part hereof, U.S. Provisional Application No. 60/433,485 filed Dec. 13, 2002.

FEDERALLY SPONSORED RESEARCH OR DEVELOPMENT

Not Applicable.

TECHNICAL FIELD

The present invention relates to a cooking system having a heat distributing conductive member and a grease control structure for use with a barbecue grill. More specifically, the present invention relates to a cooking grate having an energy receptor portion and a grease control structure for cooking food.

BACKGROUND OF THE INVENTION

The popularity of barbecue grills and outdoor cooking devices has increased tremendously over the last twenty-five years. Initially, charcoal barbecue grills having combustible solid fuel were utilized to cook food via radiant and convective heat. Subsequently, gas barbecue grills which employ a gas burner have been utilized. The gas barbecue grills generally cook the food via radiant and convective heat. Often, the food to be cooked in both charcoal and gas grills is situated on a grid-like cooking grate having numerous elongated bars and openings. Accordingly, to cook food in such barbecue grills, the radiant and convective heat energy dispelled from either the charcoal or gas burners passes through the cooking grate and is directed at the food.

Furthermore, such conventional gas grills generally include a burner assembly adjacent the lower portion of a firebox with a cooking grid supported along the upper edge thereof. Lava rock or some other ancillary conductive member is generally located between the cooking grid and the burner assembly. The lava rock operates as a form of a conductive member which absorbs the convective heat from the burning gas, and which subsequently provides a generally uniform convective heat-emitting means for the food being cooked on the cooking grate. Unfortunately, grease and other combustible particles build up on the lava rock and cause undesirable flare ups and hot spots within the grilling cavity. Additionally, the lava rocks have to be replaced periodically due to degradation Accordingly, the Assignee of the present invention previously developed a gas grill which eliminated the need for lava rock. Such grills are disclosed in U.S. Pat. Nos. 4,677,964; 5,765,469; and, 5,934,183. The gas grills disclosed therein have revolutionized the gas grill industry by eliminating the need for the lava rock. The gas grills disclosed in the above-noted patents utilize sear bars which are positioned between the cooking grid and the gas burners to vaporize any greases that emanate from the food being cooked. Like the lava rock, the sear bars operate as a remote conductive member between the gas burner and the cooking grate. The conductive sear bars emit convective energy which is partially directed at the food on the cooking grate to cook the food.

Even though the revolutionary gas grills identified above utilize a different type of fuel and a different type of conductive member, these grills as well as the charcoal grills typically cook substantially through convection-type cooking based on convective energy being emitted from the conductive member or the energy source (i.e., the charcoal or the gas burner). Convection is the transfer of energy by means of the bulk motion of material containing a different amount of energy-per-volume than its surroundings. As such, these grills heat the air within the grill's cooking chamber in order to cook the food.

Additionally, conventional cooking grates utilized in the above-type barbecue grills typically include a plurality of elongated members, openings, and cross members that define the cooking grid or cooking grate for the food. An example of the conventional grate is found in U.S. Pat. No. 5,490,452 to Schlosser et al. There, the grate is formed from a plurality of elongated rods with openings therebetween. The rods are located within a perimeter defined by a circular ring. Another example of the conventional grate is shown in U.S. Pat. No. 6,481,343 to Rigney et al. There, the grate has a generally rectangular shape with numerous openings and elongated structures. Conventional grates, however, suffer from an inability to direct or control the flow of grease and byproducts generated while cooking food on the grate. Instead, conventional grates merely allow grease and byproducts to pass through the various openings in a random manner without directing such passage. Furthermore, as explained above, conventional grates suffer from the inability to effectively conduct heat to the food. As a result, conventional grates cannot direct the flow of grease and byproducts away from hot burner assemblies during operation of the grill. In addition, conventional grates cannot direct the flow of grease and byproducts to an intended location for drainage or removal from the grill. Consequently, conventional grates permit the accumulation of grease and byproducts which negatively affects the performance and operation of the barbecue grill. Finally, because conventional grates do not provide for sufficiently conducting heat, they merely allow for the passage of radiant and convective heat energy to pass from the heat source to the food, as opposed to providing conductive energy via the grate to cook the food.

Accordingly, there is a need for a cooking grate that operates as a conductive member and which provides conductive energy to cook the food.

SUMMARY OF THE INVENTION

The present invention relates to a grate for use with a barbecue grill assembly. The grate operates as a conductive member, and is situated between the burner element and the food to the cooked.

According to one aspect of the present invention, the cooking grate has a solid energy receptor portion positioned in close proximity to the burner and a plurality of cooking members depending therefrom. Moreover, the solid energy receptor portion is generally positioned directly above the gas burner such that no structure is located between the gas burner and the solid energy receptor portion of the cooking grate. The upper surfaces of the cooking members of the cooking grate define a cooking surface for the grate. Generally, the solid energy receptor portion of the cooking grate receives radiant and convective energy directly from the gas burner, and transfers conductive energy to the cooking members for cooking the food thereon.

According to another aspect of the present invention, the cooking chamber does not include a sear bar or any conventional conductive metal structure between the grate and the burner.

According to another aspect of the present invention, a plurality of openings are located between the cooking members. Typically no openings, however, are provided in the solid energy receptor portion of the cooking grate. The openings allow a portion of the energy emitted from the gas burner to pass through the cooking grate and into an upper portion of the cooking chamber for convective heating.

According to another aspect of the present invention, the cooking grate has a mass. A substantial portion of the mass of the cooking grate is provided in the solid energy receptor portion, or adjacent the energy receptor surface, of the cooking grate. In one embodiment the energy receptor portion of the cooking grate provides over 30% of the mass of the cooking grate. In another embodiment, the energy receptor portion of the cooking grate provides approximately at least 35% of the mass of the cooking grate.

According to another aspect of the present invention, the cooking grate further comprises an intermediate plane defined by a surface intermediate the cooking surface and the lower surface. A substantial portion of the mass of the cooking grate is located between the intermediate plane and the energy receptor plane. Additionally, the mass of the cooking grate located between the intermediate plane and the energy receptor plane, and the mass of the cooking grate located in the solid energy receptor portion of the cooking grate may be over 65% of the total mass of the cooking grate.

According to another aspect of the present invention, a grease control assembly is provided to direct the flow of grease and byproducts generated during the cooking process.

According to another aspect of the present invention, the grease control assembly is positioned generally over the burner to prevent grease and byproducts generated by cooking food on the grate from coming into contact with the burner. In one embodiment the cooking members are elongated members or bars. The bars extend substantially from a front edge of the grate to a rear edge of the grate. Preferably, the bars are generally parallel and are spaced a distance apart to define a grid. The grate has a plurality of openings, where an opening is positioned between bars.

According to another aspect of the present invention, the grease control assembly comprises an upper grease control assembly and a lower grease control assembly. The upper grease control assembly generally corresponds to the upper portion of the grate and comprises a plurality of rib groups and a plurality of ledges. Each ledge is positioned between the rib groups and near a peripheral region of the grate. The intersection of the rib groups and the ledges defines a central region of the grate. The rib groups are comprised of a plurality of ribs wherein each rib is adapted to direct or guide the flow of grease and byproducts generated while cooking food on the grate. The rib has at least one inclined surface extending from the cooking surface towards a lower edge of the rib. The rib can have a second inclined surface wherein the inclined surfaces converge to define a peak. Once grease comes into contact with the rib, grease migrates down the inclined surfaces to the edges of the rib. In this manner, the drainage of grease and byproducts occurs in a controlled and directed manner.

According to another aspect of the present invention, the lower grease control assembly comprises a ridge that depends from a lower surface of the grate. The ridge may include an outer ridge and an inner ridge. The outer ridge has an outer wall, an inner wall, and a bottom wall. The inner ridge has an outer wall, an inner wall, and a bottom wall. Preferably, neither the inner ridge nor the outer ridge intersects the openings of the grate. The outer and inner ridges depend substantially perpendicular to the lower surface of the grate. The outer ridge and the inner ridge define a cavity.

According to another aspect of the present invention, the outer and inner ridges are cooperatively positioned with the upper grease control assembly. Thus, the lower grease control assembly is cooperatively positioned with the upper grease control assembly. When the grate is positioned in a use position within the cooking chamber, the grease control assembly is positioned generally above the burner tube. In the use position, ribs from the rib groups of the upper grease control assembly are positioned over a portion of the burner tube. The first surface of the rib is positioned over the intermediate and inner portions of the burner tube. The edge of the first surface extends beyond a wall of the burner tube. The second surface of the rib is positioned over the intermediate and outer portions of the burner tube. The edge of the second surface extends beyond a wall of the burner tube. The peak or apex of the rib is positioned generally above the intermediate portion of the burner tube.

According to another aspect of the present invention, the grease control assembly directs and controls the flow of grease and byproducts to ensure the removal or drainage of the grease from the firebox. This assists in decreasing the build-up of grease and byproducts which can negatively affect the performance and operation of the barbecue grill assembly. Furthermore, the grease control assembly assists in directing the flow path of grease such that it generally does not make contact with the burner tube during operation of the barbecue grill assembly.

Other features and advantages of the invention will be apparent from the following specification taken in conjunction with the following drawings.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

FIG. 4 is a partial perspective view of the grate of FIG. 1, showing a top portion of the grate;

FIG. 5 is a partial perspective view of the grate of FIG. 1, showing a top portion of the grate;

FIG. 6 is a bottom perspective view of the grate of FIG. 1;

FIG. 12 is a bottom perspective view of the grate of FIG. 11.

DETAILED DESCRIPTION OF THE INVENTION

Figure 1:
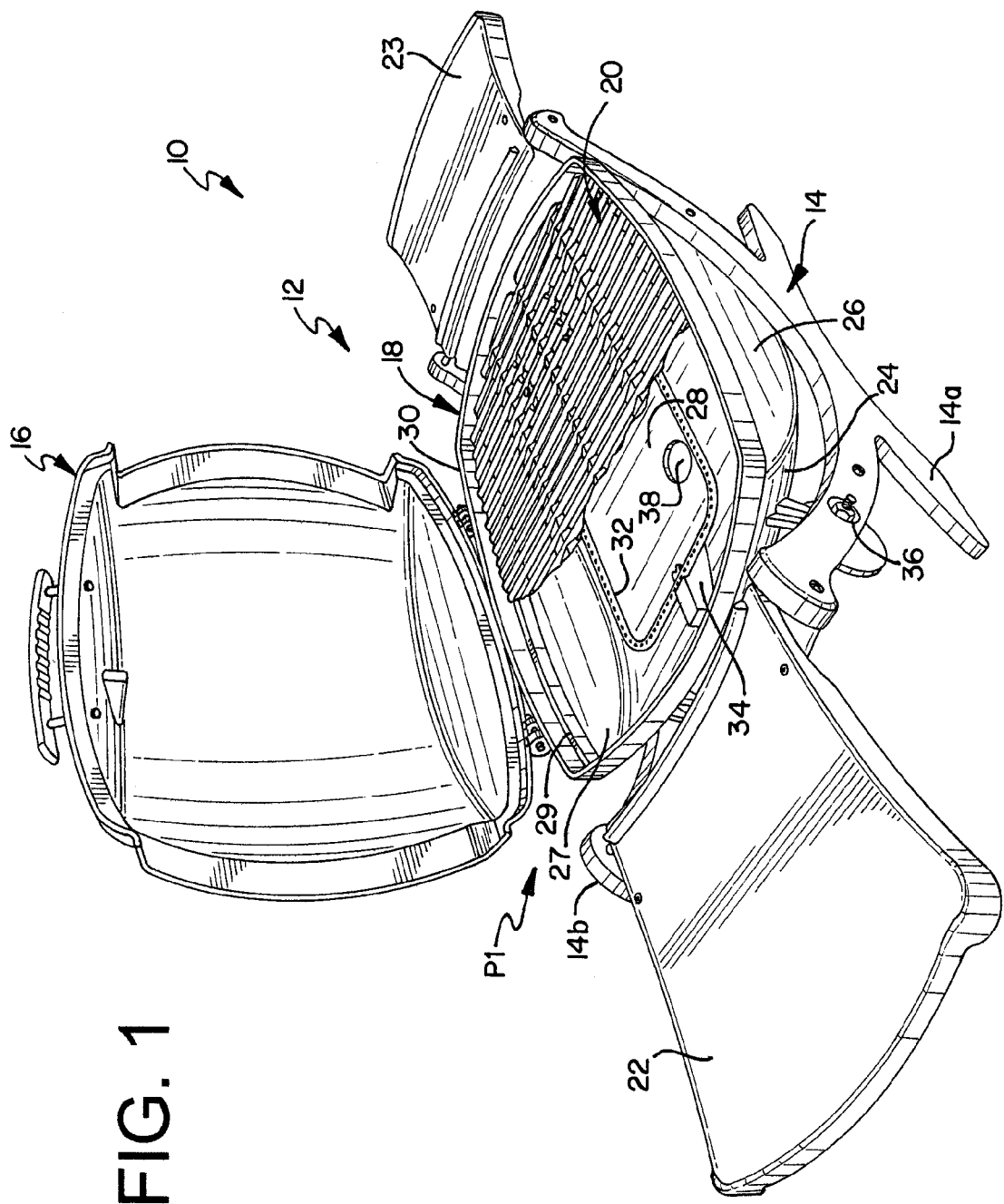
FIG. 1 is a perspective view of a barbecue grill assembly showing a grate of the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

A barbecue grill assembly 10 is shown in FIG. 1. The barbecue grill assembly 10 generally includes a cooking chamber 12 and a support frame assembly 14. The support frame assembly 14 is adapted to provide support to the cooking chamber 12 and has a front structure 14a and a rear structure 14b. The cooking chamber 12 includes a cover 16 hingeably connected to a firebox 18. A grate 20 is positioned generally within the firebox 18. As explained below, in a preferred embodiment the grate 20 has a grease control assembly 21 that directs and controls the flow of grease and byproducts generated by cooking food on the grate 20. The barbecue grill assembly 10 further includes a first work surface 22 and a second work surface 23, each pivotally connected to a portion of the support frame assembly 14.

The firebox 18 of the embodiment in FIG. 1 has an interior geometry or configuration defined by a first side wall 24, a second side wall 25, a front wall 26, a rear wall 27 and a bottom wall 28. As shown in FIG. 1, the side walls 26, 27 and the bottom wall 28 have a sloped or curved configuration. A ledge 29 is positioned along the interior portion of the firebox 18. The ledge 29 is adapted to support the grate 20 in a generally horizontal position below a rim 30 of the firebox 18. Alternatively, the ledge 29 is omitted and the firebox 18 has a plurality of individual structures to support the grate 20.

Because the barbecue grill of the present invention does not require separate members over the gas burners, the grill has a compact configuration meaning that its overall height is less than that of conventional upright barbecue grills. As a result, the barbecue grill assembly 10 is capable of operation while positioned on a table top. Furthermore, the barbecue grill assembly 10 is sized such that it can be lifted by a single user and carried between locations for use.

A burner element 32 is positioned generally within a lower portion of the firebox 18 of the cooking chamber 12, and below the grate 20. In contrast to conventional barbecue grill assemblies, the cooking chamber 12 lacks a sear bar or conductive metal or lava rock structure positioned between the burner element 32 and the grate 20. In a conventional barbecue grill, sear bars and/or conductive structures are adapted to shield the burner from grease dripping from the grate. Since the grate 20 has a grease control assembly 21 and a solid energy receptor member 37, sear bars and/or conductive structures are not required in the grill assembly 10.

As shown in the figures, in the preferred embodiment disclosed, the burner element 32 is preferably a burner tube or loop. However, a conventional linear, H-shaped burner or any other shape or type of burner can be employed in the barbecue grill assembly 10 of the present invention. A portion of the burner 32 is supported within the firebox 18 by a block 34 extending from the first side wall 24. The burner 32 disclosed has a plurality of linear, curvilinear, and transition segments resulting in a continuous configuration. This burner 32 geometry or configuration is similar to the interior geometry of the firebox 18 such that the burner tube 32 is capable of being received by the firebox 18. Preferably, the burner 32 is a cylindrical element with a circular cross-section with an inner wall diameter and an outer wall diameter. An inlet portion of the burner 32 extends through an opening 35, shown in FIG. 8, of the second side wall 25 and is connected to a fuel source (not shown) to define a pathway for flow of the fuel.

The burner tube 32 has a plurality of outlet ports or apertures 33 from which a flame extends thereby defining at least one burner flame region. The burner flame region is a region of the burner tube 32 defined by at least one outlet port 33 through which a flame extends during operation of the grill assembly 10. Preferably, a plurality of outlet ports 33 define the burner flame region. Although shown in FIGS. 1 and 2 as having a generally rectangular configuration, the configuration of the burner flame region varies with the design parameters of the burner element 32, including the positioning of the outlet ports 33.

As shown in FIG. 1, an ignitor button 36 extends from the front structure 14a of the support assembly 14 and is used to ignite fuel that flows through the burner 32.

Also shown in FIG. 1, a drain opening 38 is positioned in the bottom wall 28 of the firebox 18. The drain opening 38 is adapted to drain grease and other byproducts that are generated by cooking food on the grate 20 and that are directed to the opening 38 by the grease control assembly 21. Due to the grease control assembly 21 and the curved or inclined configuration of the walls 24, 25, 26, 27, and 28, grease and byproducts flow or migrate to the drain opening 38.

Figure 2:
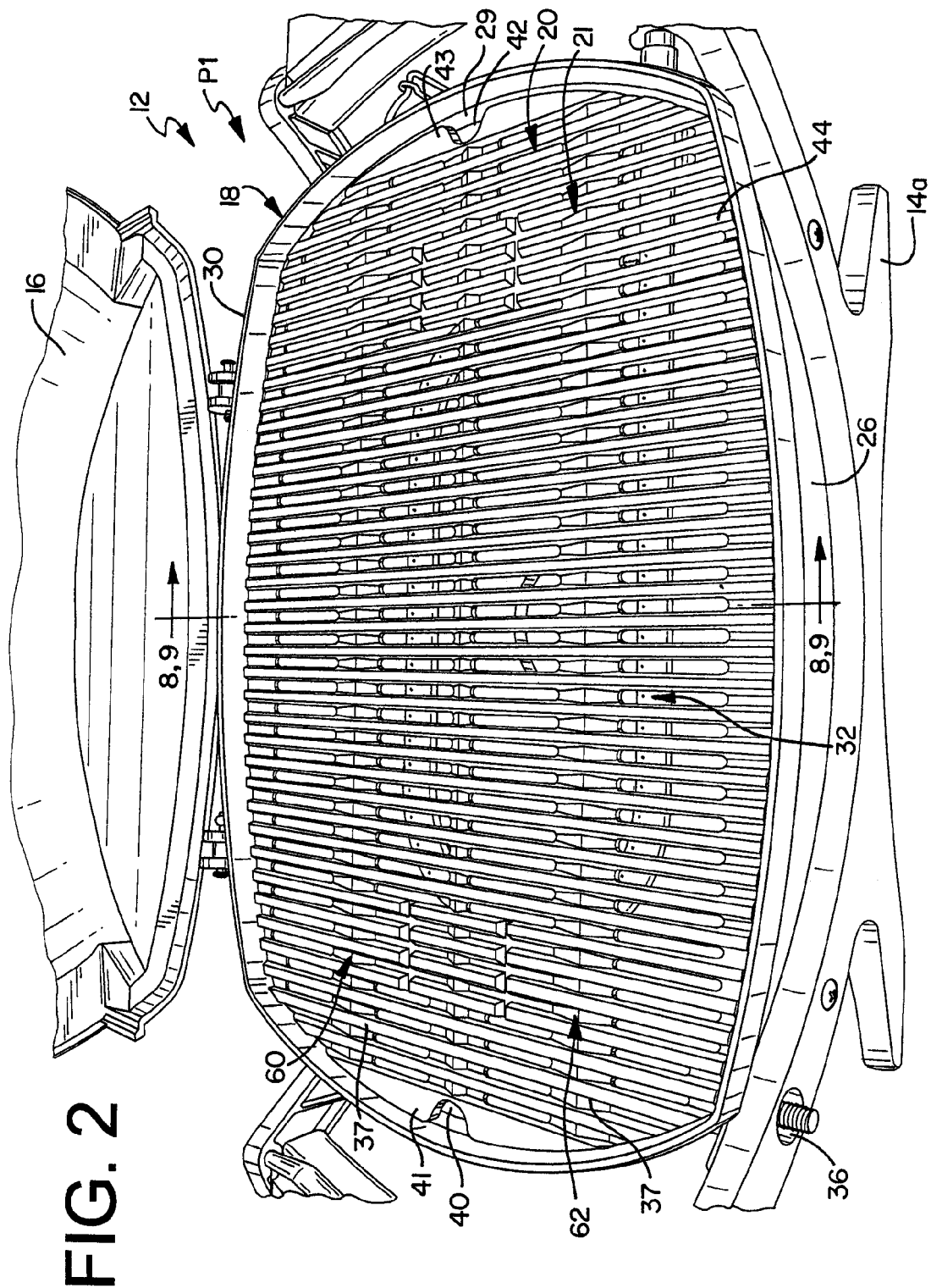
FIG. 2 is a partial front view of the grill assembly and the grate of FIG. 1.
Figure 3:
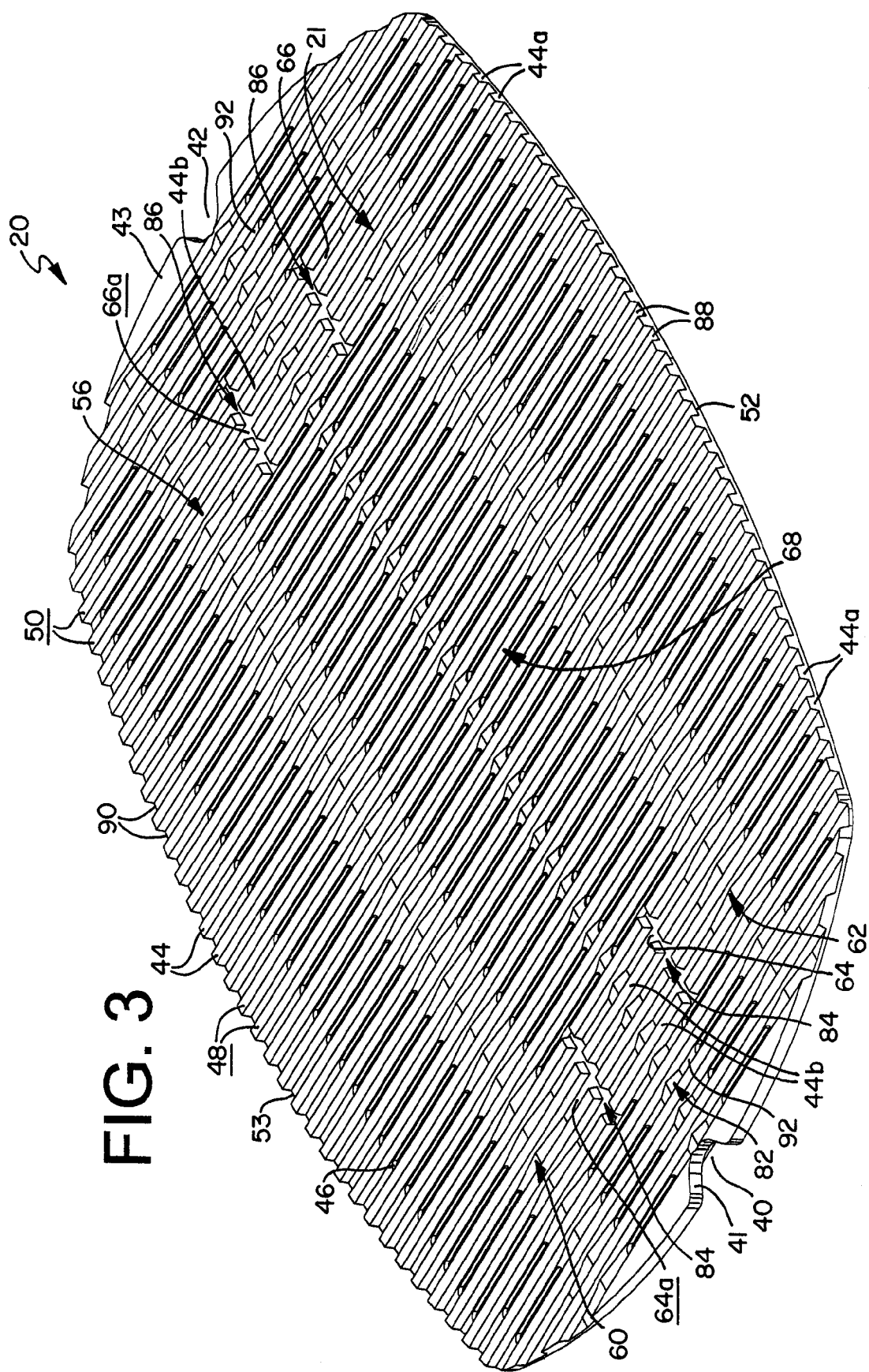
FIG. 3 is a top perspective view of the grate of FIG. 1.

As shown in FIGS. 2 and 3, in a preferred embodiment, the grate 20 includes a first recess 40 proximate a first end 41 of the grate 20, and a second recess 42 proximate a second end 43 of the grate 20. The recesses 40, 42 are adapted to allow a user to grasp the grate 20 such that it can be removably positioned within the firebox 18.

As explained above, the grate 20 includes the grease control assembly 21, a conductive heating assembly 37, a plurality of cooking members 44 and a plurality of openings 46. When the grate 20 is positioned in the cooking chamber 12, the grease control assembly 21 is positioned generally over the burner tube 32 to prevent grease and byproducts generated by cooking food on the grate 20 from coming into contact with the burner tube 32. Similarly, in the preferred embodiment, the portion of the grate 20 above the burner 32 forms the solid energy receptor portion 37 of the grate 20.

The grate 20 has a cooking surface 50 that is defined by the upper surface 48 of the plurality of cooking members or bars 44. The cooking members or bars 44 may have any shape without departing from the scope of the present invention. For example, the cooking members 44 may be rectangular, circular, V-shaped, etc. The cooking surface 50 defines an upper cooking plane and is adapted to receive food to be cooked on the grate 20. The cooking surface 50 may have a generally rectangular configuration, however, the configuration varies with the configuration of the grate 20 and the bars 44. In a preferred embodiment, the cooking members 44 are generally parallel and are spaced a distance apart to define a grid.

Figure 7:
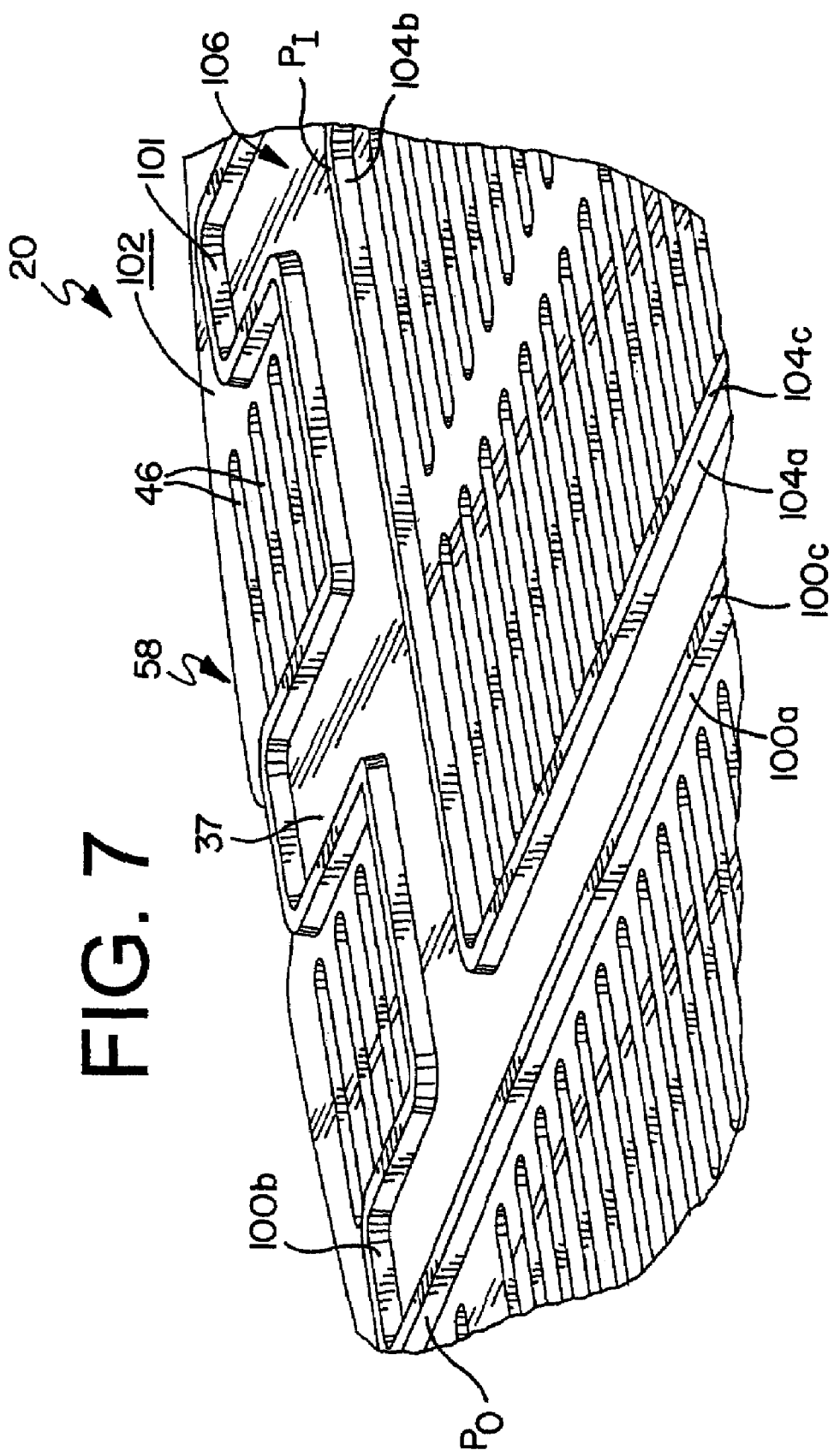
FIG. 7 is a partial perspective view of the grate of FIG. 1, showing an bottom portion of the grate.

As stated above, the grate 20 has a plurality of openings 46 wherein an opening 46 is positioned between bars 44. None of the openings, however, are provided in the solid energy receptor portion 37 of the grate 20. The exact number of openings 46 varies with the design parameters of the grate 20. Additionally, the size or length of the openings 46 varies depending upon their location in the grate 20. For example, in one embodiment an opening 46 in a central region of the grate 20 is larger than an opening 46 in a peripheral region of the grate 20. Although shown as having a generally elongated configuration, the shape of the openings 46 varies with the design parameters of the grate 20. Thus, while the openings 46 have a rounded edge 54 as shown in FIG. 7, the edge 54 can be linear, jagged or any other shape. Each of the plurality of openings 46 have an axis that is aligned vertically and extend through the entire cooking grate to permit convection of heated air from a lower portion of the cooking chamber to an upper portion of the cooking chamber.

As shown in FIGS. 3 and 6, each of the openings 46 have a length $L_{OG}$ and a width $W_{OG}$ which defines the surface area $A_{OG}$ ($A_{OG}=W_{OG} \times L_{OG}$) of each of the respective openings 46. Accordingly, the total surface area of the openings 46 is equal to the sum of all of the individual openings 46. The grate 20 also has a width $W_G$ and a length $L_G$ that defines a total surface area $A_G$ of the grate 20. In addition, the grate 20 has a ratio R defined as the ratio between the total surface area of the openings 46 divided by the total surface area of the grate. For example purposes only, one embodiment of the grate 20 has a ratio R of approximately 0.25, however, the ratio R can be extremely variable depending upon a number of factors, including the size of the grate 20 and the number and size of the openings 46. Put another way, in a preferred embodiment, the total surface area of the openings 46 is approximately 25-30% of the total surface area of the grate.

In general, the cooking grate 20 is removably positioned adjacent the gas burner 32 in the cooking chamber 12. The cooking grate 20 has an upper or cooking surface 50 and a lower surface 102. As explained above, the cooking surface 50 is generally defined by a plurality of the upper surfaces 48 of the cooking members 44. The lower surface 102 of the cooking grate 20, also referred to as the energy receptor surface, is generally defined by the bottom of the cooking grate 20. Further, a portion of the receptor surface 102 defines an energy receptor plane 103, and a portion of the cooking surface 50 defines a cooking plane 51. In a preferred embodiment, the receptor plane 103 is substantially parallel to the cooking plane 51. The cooking grate 20 also has an intermediate plane 55. The intermediate plane 55 is between the receptor plane 103 and the cooking plane 51. The intermediate plane 55 is generally defined by the lands 92 of the cooking grate 20. The lands 92 provide a surface intermediate the cooking surface 50 and the lower surface 102.

The cooking grate 20 further comprises at least one solid energy receptor portion 37. The solid energy receptor portions 37 are positioned in close proximity to the burner 32. In a preferred embodiment the lower surface 102 of the grate 20, and thus the lower surface of the solid energy receptor portions 37 of the grate 20 is approximately 2.5" from the top of the gas burner 32. It is preferred that the distance between the lower surface of the solid energy receptor portion 37 of the grate and the gas burner 32 is less than 3". Further, in a preferred embodiment, there is no structure positioned between the gas burner 32 and the solid energy receptor portion 37 of the cooking grate 20. The solid energy receptor portions 37 have a thickness which generally extends from the lower surface 102 to a distance below the cooking plane 51 defined by the cooking surface 50. Additionally, the cooking members 44, with the openings 46 therebetween, generally depend from the solid energy receptor portions 37. As explained above, and shown in the figures, while a plurality of openings 46 are provided between the cooking members 44, none of the openings 46 extend through the solid energy receptor portion 37 of the cooking grate 20. As explained in detail below, the solid energy receptor portions 37 receive energy, generally in the form of radiant and convective heat, directly from the gas burner 32, and the energy is conducted from the solid energy receptor portions 37 to the cooking members 44 for cooking the food thereon.

Further, the cooking grate 20 has a mass $M_G$ associated therewith. As is understood by one of ordinary skill in the art, the mass of an object is a fundamental measure of the amount of matter in the object. As is also understood by one of ordinary skill in the art, the weight of an object is related to its mass. Specifically, the weight of an object is defined as the mass of the object times the force of gravity on the object, and may be defined as $w=(m) \times (g)$. In a preferred embodiment, the weight of the cooking grate 20 is approximately 10-15 pounds. Because the cooking grate 20 has distinct sections thereof, the mass of the cooking grate $M_G$ is defined by the mass of the energy receptor portion $M_{ERP}$ and the combined mass of the cooking members $M_{CM}$ of the cooking grate 20. The mass of the energy receptor portion $M_{ERP}$ is generally defined as the mass of the entire area between the intermediate plane 55 and the lower surface 102, less the area of the cooking members 44, and added to the mass of the solid energy receptor portions 37. Conversely, the mass of the cooking members $M_{CM}$ of the cooking grate 20 is generally defined as the mass of the portion of the cooking grate 20 that forms the cooking members 44. A substantial portion of the mass $M_G$ of the cooking grate 20 resides in the energy receptor portion $M_{ERP}$ of the cooking grate 20. In a preferred embodiment, the energy receptor portion $M_{ERP}$ of the cooking grate 20 provides over 30% of the mass of the cooking grate $M_G$. In a further preferred embodiment, the energy receptor portion 37 of the cooking grate 20 provides at least 35% of the mass of the cooking grate $M_G$. Additionally, it is understood that a substantial portion of the mass of the cooking grate 20 is located between the intermediate plane 51 and the energy receptor surface 102. Moreover, the mass of the cooking grate 20 located between the intermediate plane 51 and the energy receptor surface 102, and the mass of the cooking grate located in the solid energy receptor portion 37 of the cooking grate 20 is approximately over 65% of the mass of the cooking grate 20. It is understood, however, that a greater or lesser percentage of mass may be provided in the energy receptor portion 37 of the cooking grate 20.

Figure 8:
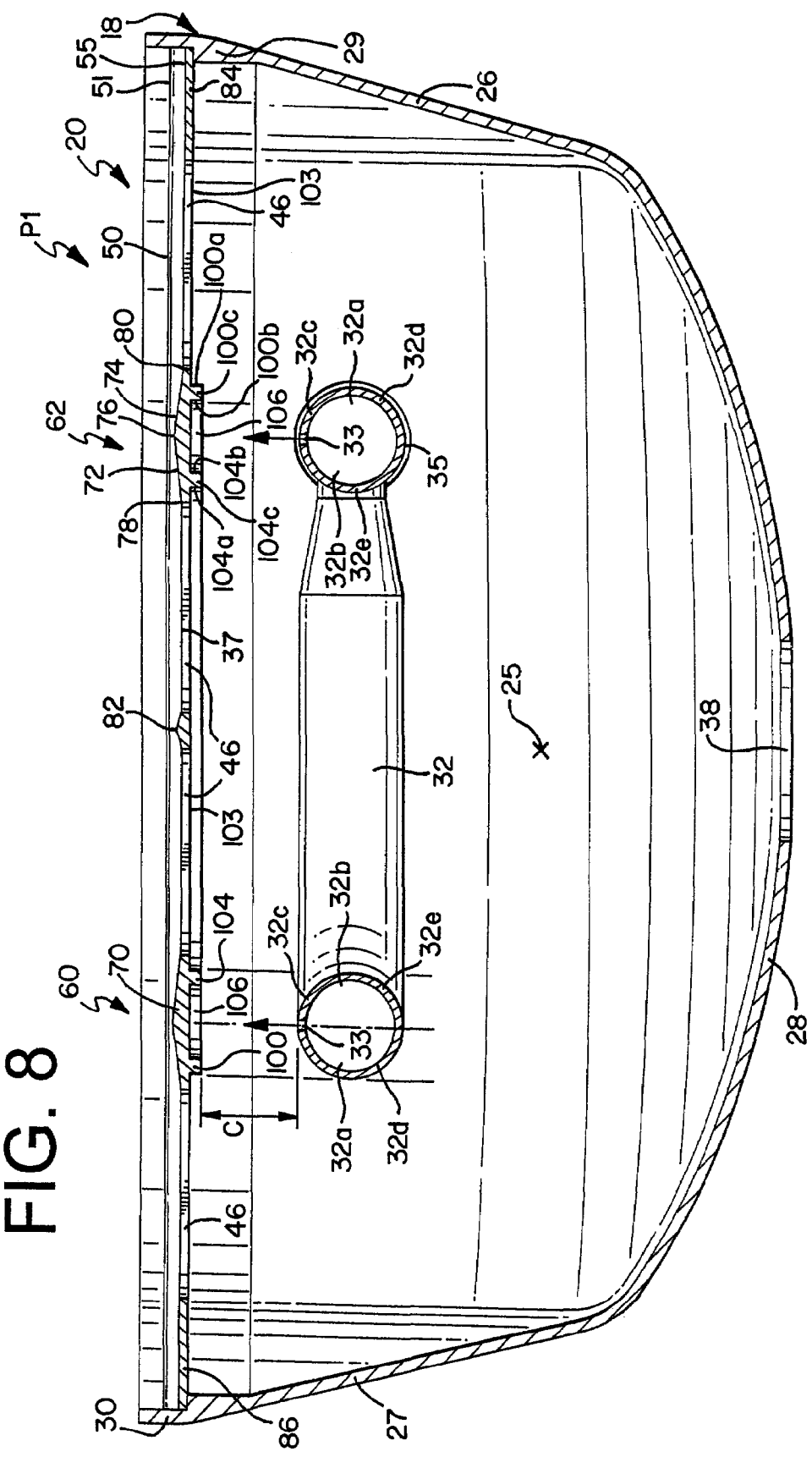
FIG. 8 is a cross-section of the grill assembly and the grate taken along line 8-8 of FIG. 2.
Figure 9:
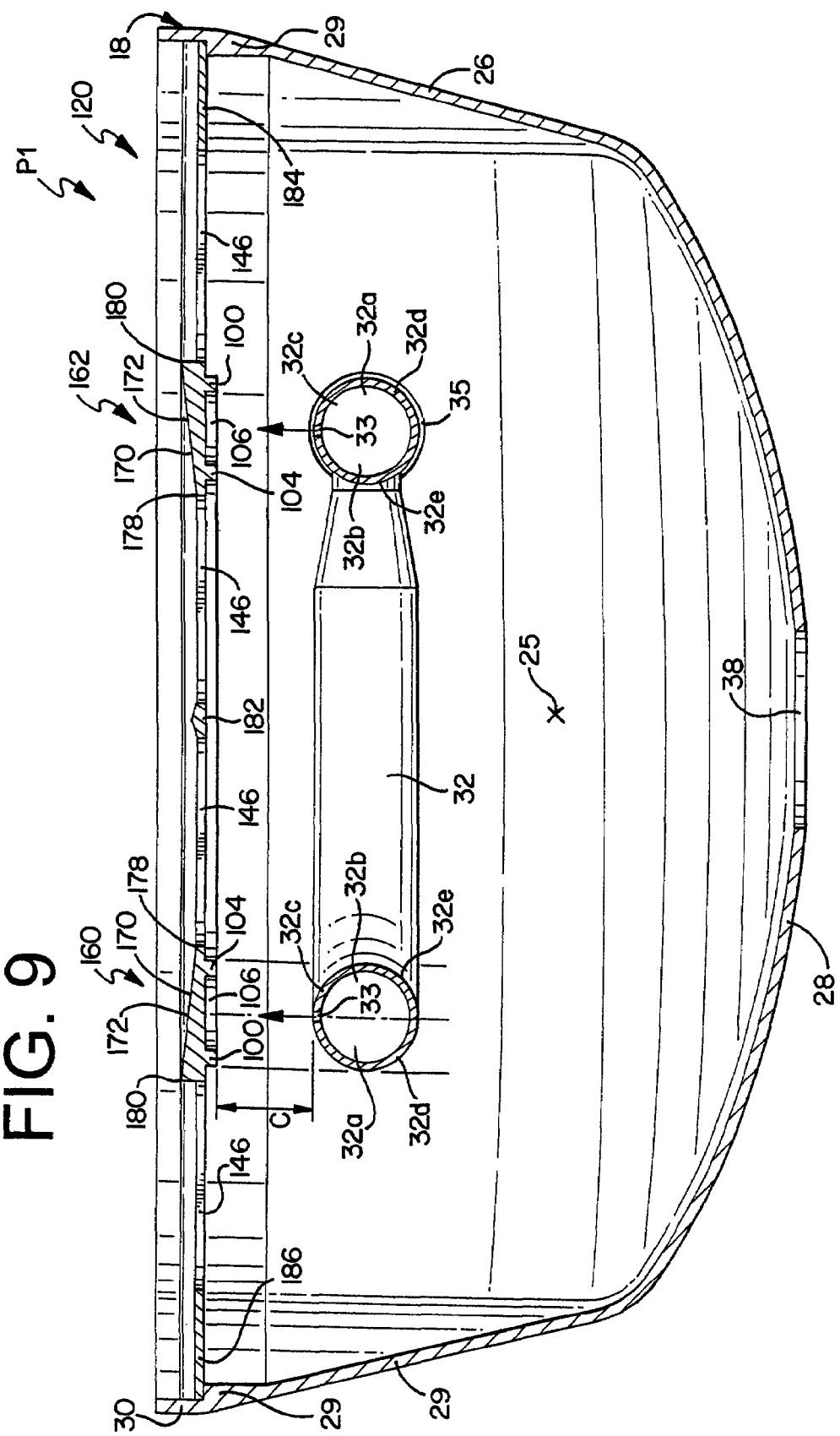
FIG. 9 is a cross-section of the grill assembly and an alternate embodiment of the grate taken along line 9-9 of FIG. 2.

As shown in FIGS. 8 and 9, the cooking grate 20 is removably positioned above the gas burner 32, with no additional structure being located there between. As such, the cooking grate 20, and specifically the solid energy receptor portion 37 of the cooking grate 20, has direct exposure to the gas burner 32. Typically, the heat source 32, whether a gas burner or a carbon product, emits both radiant and convective energy. Because of the location of the cooking grate 20 relative to the heat source 32, a majority of the energy emitted from the heat source is directed at the cooking grate 20. More specifically, a majority of the energy emitted from the heat source is directed and absorbed by the energy receptor portion 37 of the lower surface 102 of the cooking grate 20. Thus, the energy reception portion 37 of the cooking grate 20 receives energy directly from the gas burner 32.

Additionally, a portion of the energy emitted from the heat source 32 is generally received by the lower surface 102 of the cooking grate 20. It is still understood, however, that some of the energy emitted from the heat source 32 is not received by the cooking grate 20, rather it is transferred through the openings 46 in the cooking grate 20. This allows a portion of the energy emitted from the heat source 32 to pass into an upper portion of the cooking chamber 12.

The energy that is received by the energy receptor portions 37 of the cooking grate 20 is subsequently distributed through the energy receptor portion 37 of the cooking grate 20, and conductive energy is transferred from the energy receptor portion 37 of the cooking grate 20 to the cooking members 44 of the cooking grate 20 for cooking the food thereon. In a preferred embodiment, the energy received by the portion of the energy receptor portions 37 of the cooking grate 20 is distributed substantially evenly throughout the cooking grate 20. This provides for a more even heat distribution and for more uniform cooking.

Because the openings 46 only provide approximately 25-30% of the surface area of the total surface area of the grate 20, much of the energy emitted by the burners 32 that is not directed at the energy receptor portions 37 of the grate is maintained in the lower cavity of the grill. Accordingly, since a majority of the energy not consumed by the grate is maintained in the lower cavity of the grill 20, when the lid of the grill is raised a majority of the heat from a barbecue grill employing this type of cooking system does not escape. Further, since the grate 20 is positioned in close proximity to the burners 32, with no structure between the solid energy receptor portions 37 of the grate 20, the temperature of the grate 20 increases much more quickly than in prior grilling systems. As such, this type of cooking system is much more efficient than prior cooking systems. It has been found that this grilling system may be up to approximately 40% to 50% more efficient than present cooking systems.

Referring to FIGS. 3-6, in a preferred embodiment the grate 20 of the present invention has a grease control assembly 21 that comprises an upper grease control assembly 56 and a lower grease control assembly 58. The upper grease assembly 56 is generally found on the upper portion of the grate 20. As shown in the figures, the upper grease assembly 56 generally comprises a sloped grease control surface or structure 72 on an upper surface of the energy receptor portion 37 of the cooking grate 20. More specifically, however, in the preferred embodiment the upper grease control structure comprises two groups, one group for one side of the grate 20 and a second group for a second side of the grate 20. Thus, this grate has a first rib group 60, a second rib group 62, a first ledge 64, and a second ledge 66. The first and second rib groups 60, 62 are longitudinal structures that are positioned between the first and second end 41, 43 of the grate 20, and generally extend substantially the length of the grate 20 on the solid energy receptor portions 37. When viewed from above, the first and second rib groups 60, 62 have a discontinuous configuration due to the cooking members 44 that are positioned generally perpendicular to the groups 60, 62. The intersection of the first rib group 60, the second rib group 62, and the ledges 64, 66 defines a central region 68 of the grate 20. As shown in FIG. 3, in this embodiment the central region 68 has a generally rectangular configuration.

The first and second rib groups 60, 62 of the upper grease control assembly 56 are comprised of a plurality of ribs 70. Each rib 70 is adapted to direct or guide the flow of grease and byproducts generated while cooking food on the grate 20. As shown in FIG. 4, each rib 70 generally has a first inclined surface 72 and a second inclined surface 74. The inclined surfaces 72, 74 converge to define a peak or apex 76. Although the peak 76 of the rib 70 is shown positioned below the upper surface 50 of the cooking member 44, the rib 70 can be configured such that the peak 76 is coplanar with or above the upper surface 50. The first surface 72 has an edge 78 and the second surface 74 has an edge 80, wherein each edge 78, 80 is adjacent an opening 46. Once grease comes into contact with the rib 70, grease migrates down the inclined surfaces 72, 74 to the edges 78, 80 of the rib 70. In this manner, the drainage of grease and/or byproducts occurs in a controlled and directed manner. The slope or pitch of the inclined surfaces 72, 74 varies with the design parameters of the grease control assembly 21.

When viewed from the side, an upper portion of the rib 70 has a generally triangular shape, however, the rib 70 can have a rounded or bulbous configuration provided that the rib 70 remains adapted to direct the flow of grease and byproducts. Alternatively, the rib 70 has only a first inclined surface 72 such that the rib 70 has a ramp-like configuration wherein the surface 72 extends from the cooking surface 50 towards the side wall 24, 25 or the bottom wall 28 of the cooking chamber 18. The first inclined surface 72 is oriented to direct the flow of grease and byproducts away from or towards the central region 68 of the grate 20. The first and second rib groups 60, 62 are positioned about a spine 82 of the grate 20 that generally bisects the central region 68. Similar to the first and second rib groups 60, 62, the spine 82 has a discontinuous configuration. As shown in FIG. 5, the spine 82 has a peak 82a that is preferably positioned below the upper surface 50 of each cooking member 44. Alternatively, the spine 82 is omitted wherein the central region 68 has one row of openings 46, and not the two rows of openings 46 as shown in FIG. 3.

As discussed above, the grease control assembly 21 comprises a pair of opposed ledges 64, 66. Referring to FIGS. 3-5, each ledge 64, 66 is positioned between the first and second rib groups 60, 62 and near a peripheral region of the grate 20. A peripheral set of cooking bars 44a are discontinuous thereby forming intermediate bars 44b. The ledge 64, 66 is proximate the intermediate bars 44b, and thus generally positioned at the base of the intermediate bars 44b. Each ledge 64, 66 has a surface 64a, 66a that is positioned below the upper surface 50 of the cooking members 44. Although the ledge surface 64a, 66a is shown as planar, the surface 64a, 66a can be inclined or sloped. The first ledge 64 has a pair of channels 84 between the cooking bars 44a and the intermediate bars 44b. Alternatively, a single channel 84 is positioned between the peripheral bars 44a thereby eliminating the intermediate bars 44b. The second ledge 66 also has a pair of channels 86 between the cooking bars 44a and the intermediate bars 44b.

As shown in FIG. 3, the grate 20 further includes a front external ledge 88 and a rear external ledge 90. The front external ledge 88 is positioned proximate the front edge 52 and the rear external ledge 90 is positioned proximate the rear edge 53. The first and second external ledges 88, 90 are discontinuous due to the plurality of cooking bars 44. The first and second external ledges 88, 90 extend substantially the length of the grate 20. Preferably, the external ledges 88, 90 are positioned parallel to and below the cooking surface 50. Further, the external ledges 88, 90 are preferably coplanar, however, the external ledges 88, 90 can be inclined to direct the drainage of grease and byproducts generated by cooking food on the grate 20. The width of the first and second external ledges 88, 90 varies along the length of the front and rear edges 52, 53. Referring to FIGS. 3 and 5, the grate 20 further includes a series of lands 92 wherein each land 92 is positioned about the central spine 82 between the intermediate bars 44b and the recess 40, 42. The lands 92 are preferably parallel to the cooking surface 50, however, the lands 92 can be inclined to direct the drainage of grease and cooking byproducts.

As discussed above, the grease control assembly 21 of the grate 20 also includes the lower grease control assembly 58. Similar to the upper grease control assembly 56, the lower grease control assembly 58 is adapted to assist in directing the flow of grease and byproducts generated by cooking food on the grate 20. Referring to FIGS. 6-7, the lower grease control assembly 58 comprises an outer or first ridge 100 that depends from a lower surface 102 of the grate 20, and preferably a lower surface 102 of the solid energy portion 37 of the cooking grate 20. In a preferred embodiment, the outer ridge 100 has an outer wall 100a, an inner wall 100b, and a bottom wall 100c. Each of the walls 100a, 100b, 100c have a generally smooth surface. The outer ridge 100 has a plurality of linear and curvilinear segments. In addition, the outer ridge 100 has a plurality of protrusions 101.

The lower grease control assembly 58 further comprises an inner ridge 104 that depends from the lower surface 102. The inner ridge 104 has an outer wall 104a, an inner wall 104b, and a bottom wall 104c. Each of the walls 104a, 104b, 104c have a generally smooth surface. Also, the inner ridge 104 has a plurality of linear and curvilinear segments. Preferably, neither the inner ridge 100 nor the outer ridge 104 intersects the openings 46 of the grate 20. The outer and inner ridges 100, 104 depend substantially perpendicular to the lower surface 102 of the grate 102. Alternatively, the outer ridge 100 and/or the inner ridge 104 depend at an angle from the lower surface 102. Referring to FIG. 9, the outer ridge 100 has a height $H_O$, a width $W_O$, and a perimeter $P_O$. Similarly, the inner ridge 104 has a height $H_I$, a width $W_I$, and a perimeter $P_I$ with a generally rectangular configuration.

The outer ridge 100 and the inner ridge 104 define a cavity 106. Like the inner and outer ridges 100, 104, the cavity 106 may have a plurality of linear and curvilinear segments. Preferably, the cavity 106 does not intersect the openings 46 of the grate 20. The outer and inner ridges 100, 104 are cooperatively positioned with the upper grease control assembly 56. Specifically, the outer ridge 100 is cooperatively positioned with the periphery of the first and second rib groups 60 and the ledges 64, 66. Also, the inner ridge 104 is cooperatively positioned with the inner bounds of the first and second rib groups 60, 62 and the ledges 64, 66. Thus, the cavity 106 is generally positioned between the bounds of the first and second rib groups 60, 62 and the ledges 64. As a result, the lower grease control assembly 58 is cooperatively positioned with the upper grease control assembly 56.

As shown in FIGS. 1 and 2, when the grate 20 is positioned within the cooking chamber 12, the grease control assembly 21 is positioned generally above the burner 32. Since the cooking chamber 12 lacks a conventional sear bar or other conductive structure, there is no structure positioned directly between the grate 20 and the burner 32. As explained in greater detail below, the grease control assembly 21 directs and controls the flow of grease generated by cooking food on the grate 20 in controlled manner such that the grease avoids contact with the burner 32 and exits the cooking chamber 12 through the drain opening 38.

As shown in FIG. 8, the grate 20 is positioned within the cooking chamber 12 to define a use position P1. There, the grate 20 is supported in an elevated position above the burner 32 by engagement between the edges 52, 53 of the grate 20 and the ledge 29 of the firebox 18. In the use position P1, the grease control assembly 21 is positioned generally above the burner 32. Since the burner 32 of FIGS. 1 and 2 has a loop configuration, the grease control assembly 21 is positioned above both linear and curvilinear segments of the burner 32. Preferably neither the external ledges 88, 90 nor the openings 46 of the grate 20 are aligned over the burner tube 32.

In the use position P1, the lower surface 102 of the grate 20, and specifically the lower surface 102 of the solid energy receptor portion 37 of the cooking grate 20 is positioned above the burner tube 32 to define a clearance C. The clearance C represents the vertical distance between an upper surface of the burner tube 32 and a lower surface of the lower grease control assembly 58 on the solid energy receptor portion 37 of the cooking grate 20. The amount of the clearance C varies with the design parameters of the grill assembly 10, including the grate 20, the firebox 18, and the burner tube 32.

Figure 10:
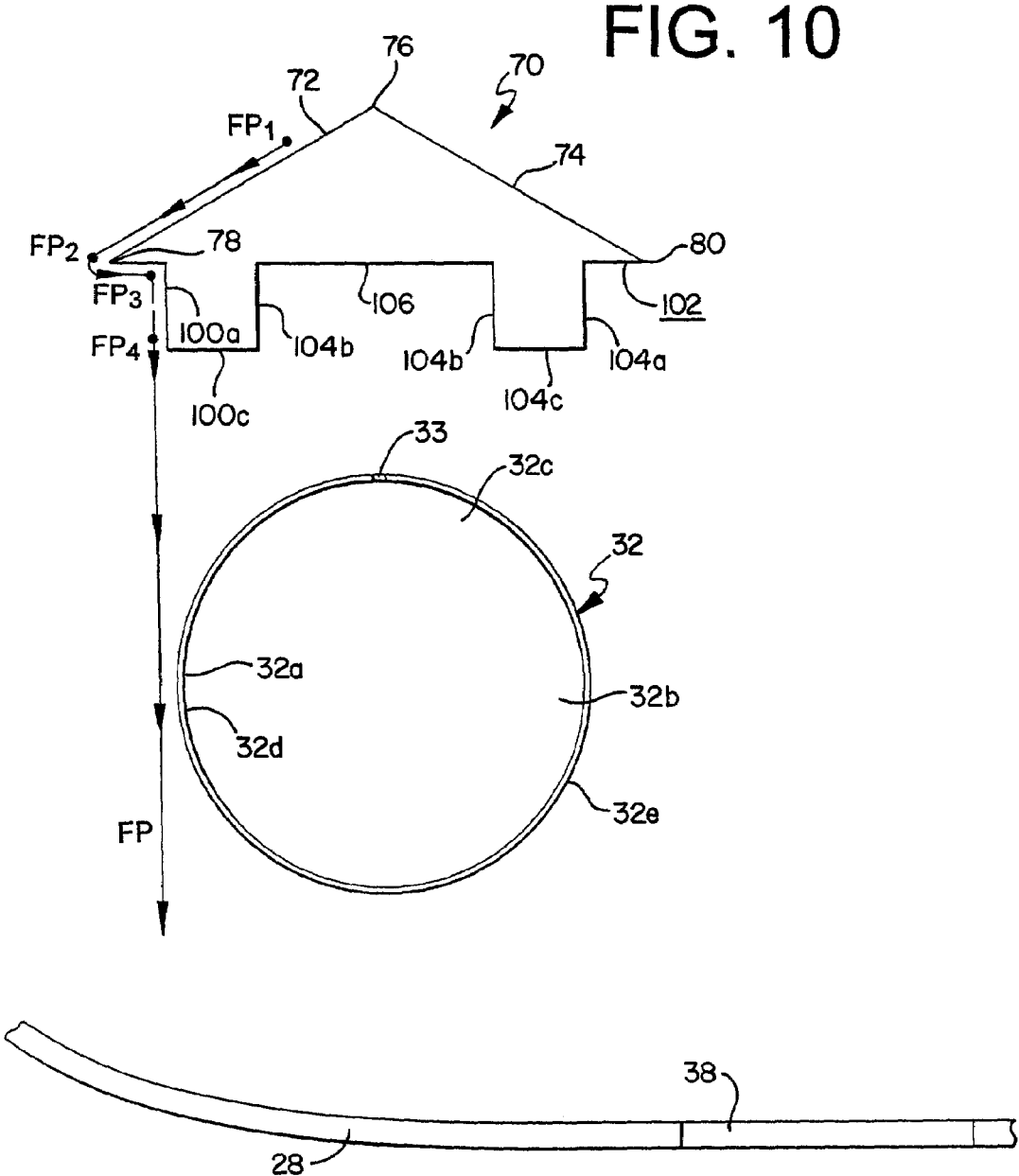
FIG. 10 is a schematic view of the operation of the grill assembly and the grate of FIG. 1.

In the use position P1 of FIG. 8, the outer ridge 100 of the lower grease control assembly 58, and thus the perimeter of the solid energy receptor portion 37 of the cooking grate 20, is generally positioned over an outer portion 32a of the burner tube 32. Specifically, as shown in FIG. 10, the outer wall 100a is positioned beyond the outer portion 32a, the inner wall 100b is positioned over the outer portion 32a, and the bottom wall 100c is positioned over the outer portion 32a. Described in a different manner, the outer wall 100a extends beyond the outer wall 32d of the burner tube 32 such that the outer wall 100a is not aligned with the outer wall 32d of the burner tube 32. Accordingly, the surface of the outer wall 100a defines a plane that lies beyond the plane defined by the outer wall 32d of the burner tube 32. Alternatively, the lower grease control assembly 58 is configured such that the inner wall 100b extends beyond the outer wall 32d of the burner tube 32. As a result, the surface of the inner wall 100b defines a plane that lies beyond the plane defined by the outer wall 32d.

Additionally, in the use position P1, the inner ridge 104 is generally positioned over an inner portion 32b of the burner tube 32. Specifically, the outer wall 104a is positioned beyond the inner portion 32b, the inner wall 104b is positioned over the inner portion 32b, and the bottom wall 104c is positioned over the inner portion 32b. Described in a different manner, the outer wall 104a extends beyond the inner wall 32e of the burner tube 32 such that the outer wall 104a is not aligned with the inner wall 32e of the burner tube 32. Accordingly, the surface of the outer wall 104a defines a plane that lies beyond the plane defined by the inner wall 32e of the burner tube 32. Alternatively, the lower grease control assembly 58 is configured such that the inner wall 104b extends beyond the inner wall 32e of the burner tube 32. As a result, the surface of the inner wall 104b defines a plane that lies beyond the plane defined by the inner wall 32e.

In the use position P1, the cavity 106 is generally positioned over an intermediate portion 32c of the burner tube 32, which contains the outlet ports that a flame extends from during operation of the barbecue grill assembly 10. The cavity 106 is at the bottom surface 102 of the solid energy receptor portion 37 of the cooking grate 20. This means that the cavity 106 below the solid energy receptor portion 37 is generally positioned over the burner flame region of the burner 32. Preferably, the cavity 106 is cooperatively dimensioned with at least the burner flame region. Alternatively, the cavity 106 has a configuration that is substantially similar to the configuration of the burner 32 such that the cavity 106 remains positioned over the burner flame region. In the event that the cavity 106 is omitted from the lower grease control assembly 58 and there is a generally continuous wall spanning the inner and outer ridges 100, 104, the outer walls 100a, 104a remain positioned beyond the outer and inner walls 32d, 32e of the burner 32.

In the use position P1, the upper grease control assembly 56 is positioned on the solid energy receptor portion 37 of the grate 20 and above an extent of the burner tube 32. As shown in FIG. 8, a rib 70 of the first rib group 60 is positioned over a portion of the burner tube 32. Similarly, a rib 70 of the second rib group 62 is positioned over a portion of the burner tube 32. In the use position P1 shown in FIG. 10, the first surface 72 of the rib 70 is positioned over the intermediate and outer portions 32a, 32c of the burner tube, however, the edge 78 of the first surface 72 extends beyond the outer portion 32a. Described in a different manner, the edge 78 extends beyond the outer wall 32d of the burner tube 32. Further, the second surface 74 of the rib 70 is positioned over the intermediate and inner portions 32b, 32c of the burner tube 32, however, the edge 80 of the second surface 74 extends beyond the inner portion 32b. Described in a different manner, the edge 80 extends beyond the inner wall 32e of the burner tube 32. The peak 76 of the rib 70 is positioned generally above the intermediate portion 32c of the burner tube 32. The degree or amount that the edges 78, 80 extend past the walls of the burner tube 32 varies with the design parameters of the grill assembly 10, including the grate 20, the grease control assembly 21, and the burner tube 32.

FIG. 9 depicts another embodiment of the grate 120 wherein the grease control assembly 121 has a geometry distinct from that shown in FIG. 8. In this embodiment, the upper grease control assembly 56 of the grease control assembly 121 has first and second rib groups 160, 162 with a unique rib 170 configuration of the upper surface of the solid energy receptor portion 37 of the grate 20. Specifically, the rib 170 has a single inclined surface 172, and not a plurality of inclined surfaces. The inclined surface 172 extends from the cooking surface 50 towards a lower portion of the cooking chamber 18. The inclination of the rib 170 begins at an internal edge 178 and terminates at an external edge 180. Alternatively, the inclination of the rib 170 begins at the external edge 180 and terminates at the internal edge 178. The slope or degree of inclination of the rib 170 can vary with the design parameters of the grease control assembly 121, including the design of the first rib group 160 and the second rib group 162. In the use position P1, the internal edge 178 generally extends beyond the internal portion 32b and the inner wall 32e of the burner tube 32, and the external edge 180 generally extends beyond the external portion 32a and the outer wall 32d of the burner tube 32.

During operation of the barbecue grill assembly 10, food is placed on the grate 20 and grease and other byproducts are generated during the cooking process. The quantity of grease and byproducts generated during the cooking process varies with a number of factors, including but not limited to the type of food cooked on the grate 20, the amount of food cooked, the amount of heat generated by the burner tube 32, and the ambient conditions. For example, cooking a steak or hamburger generally more grease and byproducts than an ear of corn or baked potato. Over time and repeated use, grease and byproducts can accumulate and negatively affect the performance and operation of the barbecue grill assembly 10. However, grease and byproducts are generally fluid such that they flow or move in a path, primarily due to the effects of gravity. Thus the effective removal of grease and byproducts is an important aspect of the barbecue grill assembly 10.

The grate 20 directs and controls the flow of grease and byproducts to assist the long-term performance and operation of the barbecue grill assembly 10. Typically, uncooked food is placed on the grate 20 which may have already been heated by flames exiting the burner tube 32. As the temperature of the grate 20 and the food increases, grease and other byproducts are generated. Since the food is in direct contact with the grate 20, a measurable quantity of grease comes into contact with various portions of the grate 20. A first quantity of the grease comes into contact with at least one opening 46 of the grate 20, and a second quantity of the grease comes into contact with the grease control structure 21 of the grate 20. When the first quantity of grease comes into contact with an opening 46, the grease generally flows through the opening 46 and to the bottom wall 28 of the firebox 18 (see FIG. 8). Since the bottom wall 28 is downwardly sloped, the majority of the grease drains or passes through the drain 38. Because the openings 46 of the grate 20 are not positioned above the burner tube 32, grease that flows through the openings 46 does not contact the burner tube 32, because the burner tube 32 does not obstruct such flow.

Referring to the schematic view of FIG. 10, grease comes into contact with a portion of the rib 70 and flows along the rib 70 to define a flow path FP whereby the grease is directed away from contact with the burner tube 32. Typically, grease first comes into contact with the first inclined surface 72 at an upper portion of the surface 72 near the peak 76. The point where grease first contacts the inclined surface 72 defines the beginning or first point FP1 of the flow path FP. Due to the inclined configuration of the rib 70, the flow path FP of grease continues along the surface 72 until it reaches the edge 78. There, the flow path FP experiences a change in direction due to the change in geometry of the rib 70. The point where the flow path FP changes direction occurs proximate the edge 78 and defines a second point FP2 of the flow path FP. Due to the effects of gravity and the geometry of the rib 70 at the edge 78, a first amount of grease in the flow path FP loses contact with the rib 70 and this amount of grease passes or drops to the bottom wall 28 of the firebox 18. Since the edge 78 extends beyond the outer wall 32d of the burner tube 32, this amount of grease does not contact the burner 32 as it drains to the bottom wall 28.

Any grease that is on the lower surface 102 of the grate 20 generally traverses until it reaches the outer wall 100a of the outer ridge 100. There, this grease in the flow path FP experiences a change in direction due to the variation in geometry between the lower surface 102 and the outer ridge 100. The point where the flow path FP changes direction occurs near where the lower surface 102 meets the outer wall 100a of the outer ridge 100 and defines a third point FP3 of the flow path FP. The flow path FP of the grease continues along the outer wall 100a until it reaches the lower edge where the outer wall 100a meets the bottom wall 100c. There, due to the effects of gravity and the geometry of the outer wall 100a, the grease in the flow path FP loses contact with the rib 70 and this amount of grease passes or drops to the bottom wall 28 of the firebox 18. The point where the grease loses contact with the outer wall 100a defines a fourth point FP4 of the flow path FP. Since the outer wall 100a of the outer ridge 100 extends beyond the outer wall 32d of the burner tube 32, grease does not contact the burner tube 32 as it drains to the bottom wall 28. Thus, the grate 20 provides the flow path FP for grease and byproducts generated during the cooking process whereby the flow path FP precludes the grease and byproducts from contacting the burner tube 32. The precise direction of the flow path FP is determined by the structural aspects of the grease control assembly 21 of grate 20, including the various components of the upper and lower grease control assemblies 56, 58.

Depending on the material utilized to manufacture the cooking grate 20, a protective coating may be applied to the grate 20 to increase the longevity and corrosion resistance of the grate 20. In addition, the protective coating may increase the non-stick properties of the grate 20. In this manner, the protective coating reduces the adhesion between food and the cooking surface 50 of the grate 20. The protective coating is applied to an upper portion of the grate 20, including the cooking member 44 and the upper grease control assembly 56. Also, the protective coating can be applied to the lower grease control assembly 58. The protective coating can be a porcelain coating or another commercially available non-stick coating such as a Teflon-based coating. Alternatively, the grate 20 can be plated with nickel or chrome to increase the longevity, corrosion resistance, and/or non-stick properties of the grate 20. Further, with certain materials, such as certain cast metals, the plating or coating of the grate 20 may not be necessary.

The grate 20 of the present invention can be formed by a number of ways, including being pressed, cast, or stamped. Further, the grate 20 can be formed in a hybrid manner combining one or more methods. For example a first portion of the grate 20 can be stamped and combined with a second portion that was formed from wire or wiring. The grate 20 can be formed from a number of materials such as steel, including low or high alloys, or iron. Alternatively, the grate 20 can be formed from aluminum, or a mixture of aluminum and another thermally conductive metal, such as copper or magnesium.

Figure 11:
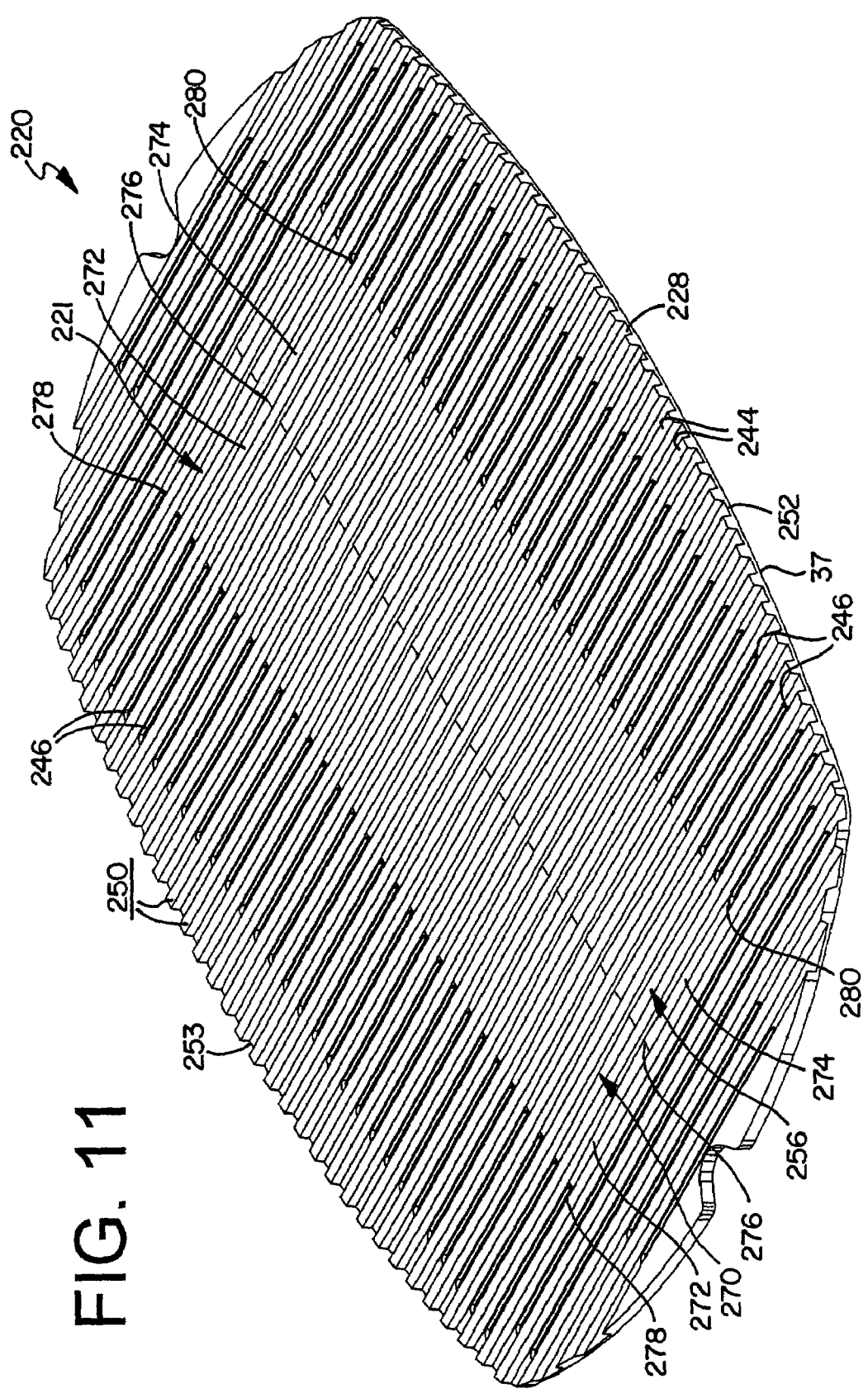
FIG. 11 is a top perspective view of an alternate embodiment of the grate.

Another preferred embodiment of the invention is shown in FIGS. 11-12. There, the grate 220 has a solid energy receptor portion 237 having a grease control assembly 221, a plurality of cooking members 244 depending from the solid energy receptor portion 237, and a plurality of openings 246. The grease control assembly 221 has a configuration distinct from that shown in FIGS. 1-9. The grease control assembly 221 comprises an upper grease control assembly 256 and a lower grease control assembly 258. The upper grease assembly 256 generally corresponds to the upper portion of the grate 220 and comprises a single rib group 260 that is generally positioned in the central region 268 of the grate 220.

The rib group 260 is comprised of a plurality of ribs 270 wherein each rib 270 is adapted to direct or guide the flow of grease and byproducts generated while cooking food on the grate 220. As shown in FIG. 11, the rib 270 has a first inclined surface 272 and a second inclined surface 274 that converge to define a peak 276. The first surface 272 has an edge 278 and the second surface 274 has an edge 280, wherein each edge 278, 280 is adjacent an opening 246. Once grease comes into contact with the rib 270, grease migrates down the inclined surfaces 272, 274 to the edges 278, 280 of the rib 270. In this manner, the drainage of grease and/or byproducts occurs in a controlled and directed manner. The slope or pitch of the inclined surfaces 272, 274 varies with the design parameters of the grease control assembly 221. Alternatively, the rib 270 has only a first inclined surface 272 such that the rib 270 has a ramp-like configuration.

Referring to FIG. 12, the lower grease control assembly 262 has a single ridge 300 that depends from a lower surface 302 of the grate 220. The ridge 300 has an outer wall 300a, an inner wall 300b, and a bottom wall 300c. Each of the walls 300a, 300b, 300c have a generally smooth surface. The ridge 300 depends substantially perpendicular to the lower surface 302 of the grate 222. Alternatively, the ridge 300 depends at an angle from the lower surface 302. The ridge 300 defines a cavity 306 on the lower surface 302 of the energy receptor portion 337 of the grate 220. Preferably, the cavity 306 does not intersect the openings 246 of the grate 220. The outer ridge 300 is cooperatively positioned with the upper grease control assembly 260. Thus, the cavity 306 is cooperatively positioned with the upper grease control assembly 260.

In the use position P1 where the grate 220 is positioned within the cooking chamber 12, the grease control assembly 221 is positioned generally above a burner. The burner has a configuration that is substantially similar to the configuration of the grease control assembly 221. Specifically, the burner has a rectangular configuration and the rib group 260 has a similar rectangular configuration. As a result, the grease control assembly 221 directs and controls the flow of grease and byproducts such that the grease avoids contact with the burner as it flows to the drain opening in the bottom of the firebox.

In another preferred embodiment, the lower grease control assembly 58 is omitted from the grease control assembly 56. As a result, the grate 20 only has an upper grease control assembly 56 to direct and control grease generated while cooking food on the grate 20. Grease and byproducts would flow and drain from the upper grease control assembly 56 in a manner consistent with that described above. Thus, grease and byproducts will flow to the edges 78, 80 of the ribs 70 and drain vertically downward therefrom. Since the upper grease control assembly 56 is not aligned with the burner 32, grease draining from the edges 78, 80 will not make contact with the burner 32. As an additional measure, the barbecue grill assembly 10 can include a blocking structure positioned between the burner 32 and the grate 20. Specifically, the blocking structure is cooperatively positioned with the upper grease control assembly 56 and the burner 32. Preferably, the blocking structure is positioned slightly above the upper surface of the burner 32 and the blocking structure is cooperatively dimensioned with the burner 32. The blocking structure is made from metal and has a generally thin-wall construction such that heat can transfer through the blocking structure and to the grate 32. The blocking structure can have an angled or peaked construction whereby the structure has a tent-like configuration.

The grate 20 of the present invention provides a number of significant advantages over conventional grates. First, because no additional conductive member is utilized, and since the solid energy portion 37 of the cooking grate 20 is located adjacent the burner 32, the height of lower portion of the cooking chamber of the grill can be extremely shortened. Further, if the grate 20 has a grease control structure 21, the grate 20 can direct the flow path FP of grease to ensure the removal or drainage of the grease from the firebox 18. This prevents the build-up of grease and byproducts which can negatively affect the performance and operation of the barbecue grill assembly 10. The grate 20 directs and controls the flow of grease and byproducts to help assist the long-term performance and operation of the barbecue grill assembly 10. Furthermore, the grate 20 directs the flow path FP of grease such that it does not make contact with the burner tube 32 during operation of the barbecue grill assembly 10.

While the specific embodiments have been illustrated and described, numerous modifications come to mind without significantly departing from the spirit of the invention and the scope of protection is only limited by the scope of the accompanying Claims.

We claim:

1. A barbecue grill assembly comprising:
a cooking chamber;
a gas burner positioned in a lower portion of the cooking chamber;
a cooking grate removably positioned in the cooking chamber and adjacent the gas burner, the cooking grate having a cooking surface made of upper surfaces of a plurality of cooking members to define an upper cooking plane, and a lower surface, the cooking grate further having a solid energy receptor portion positioned in close proximity to the burner, a plurality of the cooking members depending from the energy receptor portion, and a plurality of openings between the cooking members, each of the plurality of openings having an axis which is aligned vertically and extending through the entire cooking grate to permit convection of heated air from a lower portion of the cooking chamber to the upper portion of the cooking chamber, wherein no openings extend through the solid energy receptor portion, and wherein the solid energy receptor portion is positioned directly above the gas burner such that no structure is located between the gas burner and the solid energy receptor portion of the cooking grate;
the energy receptor portion having a sloped grease control structure configured on an upper surface of the energy receptor portion to direct grease through the openings between the cooking members; and, an apex of the grease control structure being located at an elevation below the cooking surface of the cooking grate and between the cooking members, whereby the apex has direct exposure to items placed on the cooking surface.

2. The barbecue grill of claim 1, wherein the cooking grate has a mass, and wherein a substantial portion of the mass of the cooking grate resides in the solid energy receptor portion of the cooking grate.

3. The barbecue grill assembly of claim 1, wherein the solid energy receptor portion has a thickness extending from the lower surface to a distance below the cooking surface.

4. The barbecue grill assembly of claim 1, further comprising an upper grease control structure and a lower grease control structure, the upper grease control structure comprising a plurality of ribs having at least one inclined surface extending downward toward the lower surface of the cooking grate, and the lower grease control structure comprising a ridge depending from the lower surface and forming a closed loop around the perimeter of the solid energy receptor portion.

5. The barbecue grill assembly of claim 4, wherein the lower grease control structure is positioned on the cooking grate and past an extent of the gas burner below the cooking grate to prevent grease from draining onto the burner flame region of the gas burner.

6. The barbecue grill assembly of claim 1, wherein the cooking grate further comprises an intermediate plane defined by a surface intermediate the cooking surface and the lower surface.

7. The barbecue grill assembly of claim 6, wherein the cooking grate has a mass, and wherein a substantial portion of the mass of the cooking grate is located between the intermediate plane and the lower surface.

8. The barbecue grill assembly of claim 7, wherein the mass of the cooking grate located between the intermediate plane and the lower surface, and the mass of the cooking grate located in the solid energy receptor portion of the cooking grate is over 65% of the mass of the cooking grate.

9. A gas barbecue grill assembly comprising:

a cooking chamber;

a first gas burner section having a first flame region and a second gas burner section having a second flame region, the first and second gas burner sections positioned in a lower portion of the cooking chamber, wherein the first gas burner section is generally transverse to the second gas burner section;

a cooking grate removably positioned in an upper portion of the cooking chamber and adjacent the first and second gas burner sections, the cooking grate having an upper cooking plane defined by a cooking surface of a plurality of cooking members, and a lower energy receptor plane defined by an energy receptor surface, wherein a plurality of openings are provided between the cooking members, wherein the lower energy receptor plane of the cooking grate is positioned in close proximity to the gas burner sections such that a portion of the energy receptor surface has direct exposure to a plurality of flames extending from the burner sections;

the lower energy receptor plane including a first section having a length which is parallel to the first gas burner section, the first section extending the entire length of the first flame region, and a second section having a length which is parallel to the second gas burner section, the second section extending the entire length of the second flame region;

the cooking grate having a solid energy receptor portion, the plurality of grid-like cooking members depending from the energy receptor portion, wherein none of the openings extend through the solid energy receptor portion, wherein the solid energy receptor portion receives energy directly from the gas burner sections, and wherein energy is conducted from the energy receptor portion to the cooking members for cooking food thereon;

the energy receptor portion having a sloped grease control structure configured on an upper surface of the energy receptor portion;

an apex of the grease control structure being located below the cooking surface of the cooking grate; and, an upper grease control structure and a lower grease control structure, the upper grease control structure comprising a plurality of ribs having at least one inclined surface extending downward toward the lower portion of the cooking chamber, and the lower grease control structure comprising a ridge depending from the lower surface and forming a closed loop around the perimeter of the energy receptor portion.

10. The barbecue grill of claim 9, wherein the distance between the portion of the energy receptor surface and the gas burner sections is less than 3 inches.

11. The barbecue grill assembly of claim 9, wherein the cooking grate is positioned directly above the gas burner sections such that no structure is located between the cooking grate and the gas burner sections.

12. The barbecue grill assembly of claim 9, wherein the cooking grate is positioned directly above the gas burner sections such that no structure is located between the energy receptor portion of the cooking grate and the gas burner sections.

13. The barbecue grill assembly of claim 9, wherein the cooking grate has a mass, and wherein a substantial portion of the mass of the cooking grate is located adjacent the energy receptor surface of the cooking grate.

14. The barbecue grill assembly of claim 9, wherein the mass of the energy receptor portion of the cooking grate is greater than the mass of the cooking members.

15. The barbecue grill assembly of claim 9, wherein the cooking grate has a mass, and wherein a substantial portion of the mass of the cooking grate is located in the energy receptor portion of the cooking grate.

16. The barbecue grill assembly of claim 15, wherein the energy receptor portion of the cooking grate provides over 30% of the mass of the cooking grate.

17. The barbecue grill assembly of claim 9, wherein the openings have a surface area, and wherein the sum of the surface areas of all of the openings is approximately 30% of a total surface area of the grate.

18. The barbecue grill assembly of claim 9, wherein the energy receptor surface of the cooking grate receives radiant and convective energy from the gas burner, wherein the energy is distributed through the energy receptor portion, and wherein conductive energy is transferred from the energy receptor portion of the cooking grate to the cooking members of the cooking grate.

19. The barbecue grill assembly of claim 9, wherein the lower grease control structure is positioned on the cooking grate to prevent grease from draining into the burner flame region.

20. The barbecue grill of claim 9, wherein each of the plurality of openings having an axis which is aligned vertically and extending through the entire cooking grate to allow a portion of the convective energy emitted from the gas burner to pass through the cooking grate and into an upper portion of the cooking chamber.

21. A barbecue grill assembly having a cooking chamber, and a gas burner having a plurality of burner openings, comprising:

a cooking grate removably positioned in an upper portion of the cooking chamber and adjacent the gas burner, the cooking grate having an upper cooking plane defined by an upper cooking surface, a lower receptor plane defined by a lower energy receptor surface, a solid energy receptor portion positioned directly above the gas burner, a plurality of grid-like cooking members depending from the energy receptor portion, and a plurality of openings between the cooking members, each of the plurality of openings having an axis which is aligned vertically and extending through the entire cooking grate to permit convection of heated air from a lower portion of the cooking chamber to the upper portion of the cooking chamber, the openings being dimensioned such that no burner openings are directly below any portion of openings, wherein the lower plane of the cooking grate is positioned in close proximity to the burner, and wherein the solid energy receptor portion has no openings therein, the solid energy receptor portion having direct exposure to a burner flame region extending from the burner to receive energy directly from the gas burner and to allow for energy to be conducted through the solid energy receptor portion and to the cooking members for cooking food thereon, and wherein an upper surface of the energy receptor portion has a sloped grease control structure to direct grease through the openings and away from the burner; and, an apex of the grease control structure being located at an elevation below the cooking surface of the cooking grate and between the cooking members, whereby the apex has direct exposure to items placed on the cooking surface.

22. The barbecue grill assembly of claim 21, wherein the upper grease control structure comprises a plurality of ribs having at least one inclined surface extending downward toward the lower portion of the cooking chamber.

23. The barbecue grill assembly of claim 21, further comprising a lower grease control structure comprising a ridge depending from the lower energy receptor surface and forming a closed loop around the perimeter of the solid energy receptor portion.

24. The barbecue grill assembly of claim 23, wherein the lower grease control structure is positioned on the cooking grate and past an extent of the gas burner below the cooking grate to prevent grease from draining onto the burner flame region of the gas burner.

* * * * *